US010291447B2

(12) United States Patent
Florek

(10) Patent No.: US 10,291,447 B2
(45) Date of Patent: May 14, 2019

(54) METHOD OF PROCESSING OF SIGNAL TRANSMITTED FROM THE ANALOG NFC DRIVER AND SYSTEM FOR REALIZATION OF SAID METHOD

(71) Applicants: LOGOMOTION, S.R.O., Piestany (SK); SMK-LOGOMOTION CORPORATION, Tokyo (JP)

(72) Inventor: Miroslav Florek, Bratislava (SK)

(73) Assignee: SMK Corporation (JP)

( * ) Notice: Subject to any disclaimer, the term of this patent is extended or adjusted under 35 U.S.C. 154(b) by 0 days.

(21) Appl. No.: 15/578,921

(22) PCT Filed: Jun. 1, 2016

(86) PCT No.: PCT/IB2016/053232
§ 371 (c)(1),
(2) Date: Dec. 1, 2017

(87) PCT Pub. No.: WO2016/193926
PCT Pub. Date: Dec. 8, 2016

(65) Prior Publication Data
US 2018/0183638 A1 Jun. 28, 2018

(30) Foreign Application Priority Data
Jun. 2, 2015 (SK) .................................. 50029-2015

(51) Int. Cl.
*H04B 5/00* (2006.01)
*H04L 27/06* (2006.01)
*E04H 15/20* (2006.01)

(52) U.S. Cl.
CPC ............ *H04L 27/06* (2013.01); *E04H 15/20* (2013.01); *H04B 5/0025* (2013.01); *E04H 2015/201* (2013.01)

(58) Field of Classification Search
None
See application file for complete search history.

(56) References Cited

U.S. PATENT DOCUMENTS 7,505,794 B2 * 3/2009 Watanabe .......... G06K 19/0701
455/127.1
8,082,012 B2 * 12/2011 Watanabe .......... G06K 19/0723
455/127.1

(Continued)

FOREIGN PATENT DOCUMENTS

GB 2501792 A 11/2013
KR 2013-0105259 A 9/2013

*Primary Examiner* — Tuan A Tran
(74) *Attorney, Agent, or Firm* — BakerHostetler

(57) ABSTRACT

During the contactless transfer of the data from PICC (1) to PCD (4) with the load modulation within PICC (1) the analog signal between the transmitting antenna (3) and the output of the driver (2) is demodulated. From the demodulated output the digital data are generated for the direction of the subsequent modification of the signal led to the PICC (1) antenna set. The digital data gather from the demodulated signal are used for the amplification and/or attenuation of the signal received on the side of the PCD (4) and/or for synchronization or other modification of the signal on the side of the PICC (1), whereby no further modification of the driver (2) is needed. The connection on the LA, LB outputs appears to the driver (2) by its characteristics, mainly by its impedance, in the same way as the connected antenna (3) of the original connection according to the prior state of the art. Such processing and connection allows to use broadly available analog drivers (2) which can be combined with various other elements of other producers, which achieves real compatibility and high amount of freedom when designing the circuits, as well as the independence from the particular producer of the chips.

13 Claims, 2 Drawing Sheets

(56) References Cited

U.S. PATENT DOCUMENTS

| | | | | |
|---|---|---|---|---|
| 8,125,337 B2* | 2/2012 | Uchiyama | ............ | G06K 7/0008 |
| | | | | 340/561 |
| 8,203,430 B2* | 6/2012 | Breitfuss | .............. | G06K 7/0008 |
| | | | | 340/10.1 |
| 8,471,685 B2* | 6/2013 | Shingai | ................ | G06K 7/0008 |
| | | | | 235/375 |
| 8,553,717 B2* | 10/2013 | Nakatsugawa | .... | G06K 7/10297 |
| | | | | 370/466 |
| 8,937,549 B2* | 1/2015 | Narendra | ........... | G06K 19/0701 |
| | | | | 340/572.1 |
| 9,189,724 B2* | 11/2015 | Morita | ................ | G06K 7/10237 |
| 9,379,778 B2* | 6/2016 | Roh | ...................... | H04B 5/0012 |
| 9,390,359 B2* | 7/2016 | Narendra | ........... | G06K 19/0701 |
| 9,489,608 B2* | 11/2016 | Narendra | ........... | G06K 19/0701 |
| 9,904,887 B2* | 2/2018 | Narendra | .............. | H04B 5/0062 |
| 2011/0171996 A1* | 7/2011 | Narendra | ........... | G06K 19/0701 |
| | | | | 455/558 |
| 2013/0084799 A1 | 4/2013 | Marholev et al. | | |
| 2014/0086301 A1 | 3/2014 | Akhavan et al. | | |
| 2014/0349586 A1 | 11/2014 | Dhayni | | |

* cited by examiner

METHOD OF PROCESSING OF SIGNAL TRANSMITTED FROM THE ANALOG NFC DRIVER AND SYSTEM FOR REALIZATION OF SAID METHOD

CROSS-REFERENCE TO RELATED APPLICATIONS

This application is the National Stage of International Application No. PCT/IB2016/053232, filed Jun. 1, 2016, which claims the benefit of Slovak Application Number PP 50029-2015 filed Jun. 2, 2015, the disclosures of which are incorporated herein by reference in their entireties.

FIELD OF TECHNOLOGY

The invention concerns a method and system (or connection) for processing of a signal transmitted to the transmitting antenna from the interface of the analogue output of the NFC (Near field communication) driver during the contactless transfer of the data from the PICC (Proximity Integrated Circuit Card—mainly as a portable element, for example a card) to PCD (Proximity Coupling Device—mainly as reader). The invention discloses the processing of the signal as a preparation for the subsequent modification of the signal—for example, amplification, attenuation, synchronization, diagnostics—, whereby it is not necessary to alter the analogue basis of the outputs of the original driver.

PRIOR STATE OF THE ART

During the transmission from PICC to PCD a transformer coupling is used. The transfer of the data is realized by the amplitude modulation which is generated by the change in load in the driver of the antenna. The change of load causes the change of the current on the side of the PCD, where these changes are pursued and the transferred data are digitalized from them. The driver usually has a form of a specialized chip, for example NFC chip with LA, LB outputs set to a given resonant frequency. An antenna is connected to the LA, LB outputs. In case of the analogue driver the given chip does not have a digital output with the data which could be used for the direction of the eventual further modification of the signal. The absence of digital data causes technical problems with the eventual further processing of the signal between the antenna and the driver. To solve this the driver with the digital output is used, but few available chips with the digital output exist and these are not compatible enough with the other components of the other producers.

Solutions according to publications US2014086301, KR20130105259, US2013084799, GB2501792 modulate the signal by means of an amplifier; these solutions, however, cannot be used in the existing connection with the analogue driver. Confronted with the request to modify the signal on the side of the PICC, for example, during the request for sufficient permeability of the signal with small dimensions of the carrier of the antenna, known solutions lead towards the proposal of a new driver or towards the use of the driver with the digital output, which—however—increases costs of the overall solution. Moreover, with small NFC carriers there often arise problems with the shielding of the antenna, since the carrier—for example in form of microSD card or SIM card—is inserted in the host device. In such situation the demands for multiple modifications of the signal while keeping the original analogue NFC driver arise.

Such solution is desired and not known which would allow to use commonly available drivers with the analogue output and which will as well allow to digitally direct the subsequent modifications of the signal, whereby the connection following the driver's output will appear from the side of the driver in same way or similarly as an original antenna connected directly to the outputs of the driver. The new solution cannot require the changes on the PCD side.

ESSENCE OF THE INVENTION

The deficiencies mentioned in the prior state of the art are significantly remedied by the method of the processing of the signal transmitted from the analogue NFC driver during the contactless transfer of the data from the PICC to PCD with the load modulation, where within the PICC a transmitting antenna is connected to the analogue output of the NFC driver and where the driver on its output generates a modulated signal with the transferred data heading to the PCD according to this invention which essence lies in the fact that the transmitted analogue signal is demodulated between the transmitting antenna and the output of the driver and from the demodulated output the digital data for the direction of the subsequent modification of the signal to the PICC antenna set (or system) are generated. Demodulation thus takes place already on the PICC side where the modulated signal has been created. The antenna set include other antennas aside from an antenna connected to the LA, LB outputs; preferably these other antennas will be created by the windings on a single core. The digital data basically correspond to the data which were used on the side of the driver to modulate the transmitted signal, but the respective chip with the purely analogue outputs cannot provide these data for the other circuits of the signal processing. Usually the signal transmitted to the other antenna on the side of the PICC is modified on the basis of the digital data from the demodulated signal, which modifies the signal received on the PCD side, too.

The term NFC—Near field communication—in this invention denotes any contactless transfer with at least partial use of the transformer coupling including—but not exclusively—those of the ISO/IEC 14443 standard.

PICC can have any outer form; it can be a classic card or a removable memory card of various formats, for example microSD format. The method of processing according to this invention is realized by the modification of PICC circuits only; there are no modifications on the side of the PCD reader.

The essential feature of the invention is a demodulation of the signal on the side of the transmitting PICC, whereby at this point the signal is, in fact, prepared for transmission by PICC antenna. The demodulation is a common way of processing of the received signal; however, the processing of the signal which is only being transmitted on the side of the PICC is not known yet. Within PICC the signal is modulated by the change of load; from the point of view of a designer of the electronic PICC circuits there is no point in demodulating back such signal on the side of the PICC. However, it is a demodulation and digital processing within the PICC which brings about important technical advantage. Such processing allows to use widely available analogue drivers, analogue interfaces which can be combined with various other elements. The digital output can be used by means of a digital driver, too, which can have output with digital data in order to direct the subsequent modification of the signal. But digital interface has low compatibility with the available elements of other producers. For example, if there is need to insert an amplifier between the antenna and the driver with digital output it is only possible to use compatible digital amplifier, which basically means digital amplifier of the same producer as the producer of the driver. With the solution according to this invention it is possible to use any amplifier and the digital data gained from the demodulated analogue signal can be used for its direction. It is, as if, a recovery of the data from the completed, ready-made signal within PICC.

Another advantage of this invention is the achievement of the high compatibility of the transmitting elements on the side of the PICC, since the analogue character of the driver is preserved and at the same time it allows for digital direction of the further processing of the signal. This provides a possibility to amplify, attenuate, synchronize or otherwise modify the signal between the driver and the transmitting antenna with the desired results. Common methods and elements are used for these modifications, whereby these are supplied by the digital data gathered according to this invention. The most common subsequent processing will be amplification and/or attenuation of the signal received on the side of the PCD. It will be preferable if such attenuation or amplification lasts only for a specified time period within one transmission event. The stable level of the signal at LA, LB outputs can be attenuated during the initiation of the transmission and later it can be amplified for the rest of the transmission event. The signal will usually be amplified after the initial adjustment of the levels of the PICC and PCD signals within one transmission events is finished. This increases the stability of the transmission. One transmission event can therefore involve attenuation, and in another stage amplification, of the transmitted signal.

The method of the processing of the signal transmitted from the analogue NFC driver according to this invention will—during the designing of the connection—be realized mainly by the modification of the common connection according to the prior state of the art, where the antenna is usually connected directly to the LA, LB outputs of the analogue driver. The driver in form of an NFC chip is set to a given resonant frequency and it is therefore important that the connection for the realization of the method according to this invention appears on the side of the driver in the same way as an original antenna. It is, above all, preferable if the output resistance of the connection is comparable with the impedance of the original antenna, whereby the resistors connected into the series in both branches behind the diode bridge of the demodulator in the direction from the driver to the antenna can be used for this purpose. It is preferable if the resistance of the connection does not differ from the impedance of the original antenna by more than ±20%.

With help of the digital data from the demodulation of the signal a second driver can be directed, too, which is active in the PICC antenna set. The second driver denotes a driver other than the basic driver with the analogue output, whose modulated output signal is processed by the method according to this invention. In principle it can be identical driver in terms of construction, but it will be a driver with a different position in the scheme of connection.

The deficiencies in the prior state of the art are significantly remedied by the system for the processing of the signal transmitted from the analogue NFC driver during the contactless transfer of the data from the PICC to PCD with the load modulation itself according to this invention which essence lies in the fact that between the transmission PICC antenna and the analogue output of the driver of this antenna a demodulator is connected whose output is connected to the digitizer. The data output from the digitizer is designed for the direction of the subsequent modification of the signal or for other use related to the course of the transmitted signal. The digitizer serves to convert the analogue signal to digital.

It will be preferable if the resistance of the whole system (connection) on the side of the antenna is further regulated by means of the resistances on the branches in such a way that it does not differ from the impedance of the original antenna in more than ±20%.

The connection generates on the output of the digitizer data which can be used for example in such a way that the second, power driver is connected to the digitizer whereby this second driver helps to change the amplitude of the signal detected on the side of the PCD by changing the phase. The PICC antenna set can include second winding; in preferable arrangement the second winding will be on the same core as the winding of the first antenna and it will form a second antenna. The antenna and second antenna together form a PICC antenna set in one of the preferable arrangements according to this invention. A person skilled in the art can produce other subgroups of the connections which use demodulator between the driver and the antenna and the digitizer is connected to the demodulator according to required form of the subsequent processing of the signal.

The described essence of the invention can be also used in the system (connection) where multiple independent analogue drivers are connected. In such case it is preferable if the connection includes a switch by which the circuit of the demodulator is connected only to one of the multiple drivers. Each driver can be assigned to the independent secure element (memory element resistant to unauthorized manipulation, usually in form of a chip with the safe controller capable of hosting an application and confidential and cryptographic data, mainly keys in accordance with the given rules and standards) placed within PICC. If the switch is analogue, the hardware of the switch will prevent the undesired connection of the two inputs at the same time.

The invention brings about a possibility of a simple modification of the existing design of the PICC transmitter with the driver without the digital output, whereby higher compatibility with the individual elements of the system from the multiple producers is achieved. The connection subsequently allows for effective modification of the signal with digital direction. The drivers with analogue output gain during the connection according to this invention indirect digital output with the directing data.

BRIEF DESCRIPTION OF DRAWINGS

Invention is further disclosed by the FIGS. 1 to 3. The chose ratios of sizes of individual elements in the schemes and diagrams and the mutual size of the PICC and PCD is illustrative only and cannot be interpreted as limiting the scope of protection. The group of elements without delimitation from one side denoted by the dashed line on the FIGS. 1 to 3 suggests that other elements necessary for the function of the PICC in multiple applications can be part of the PICC.

EXAMPLES OF REALIZATION

Example 1

Figure 2:
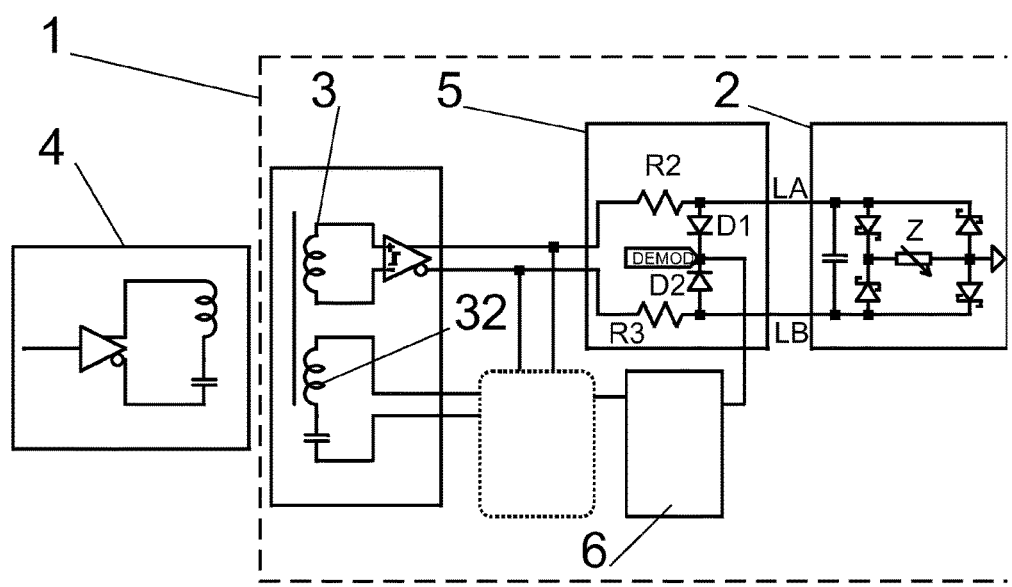
FIG. 2 depicts the example of the connection with the demodulation of the signal during the transmission from the microSD card inserted in the mobile phone. The dotted line denotes a part of the circuit which can include multiple elements pursuant to the particularly desired modification of the signal; the connection to the demodulator is crucial. The dotted line can depict the second driver, for example. In the lower part of the figure there are two independent alternatives of the placement of the PICC on the microSD card or on the SIM card. The PICC denoted by the dashed line is then included as a miniature component of the microSD or SIM card.
Figure 2:

In this example according to FIG. 2 the PICC 1 including an antenna 3 is placed in the body of the microSD card. The microSD card is intended for insertion to a respective slot in the mobile phone, whereby it is supposed to ensure sufficiently stable transmission from the microSD card through the metal body of the mobile phone.

Figure 1:
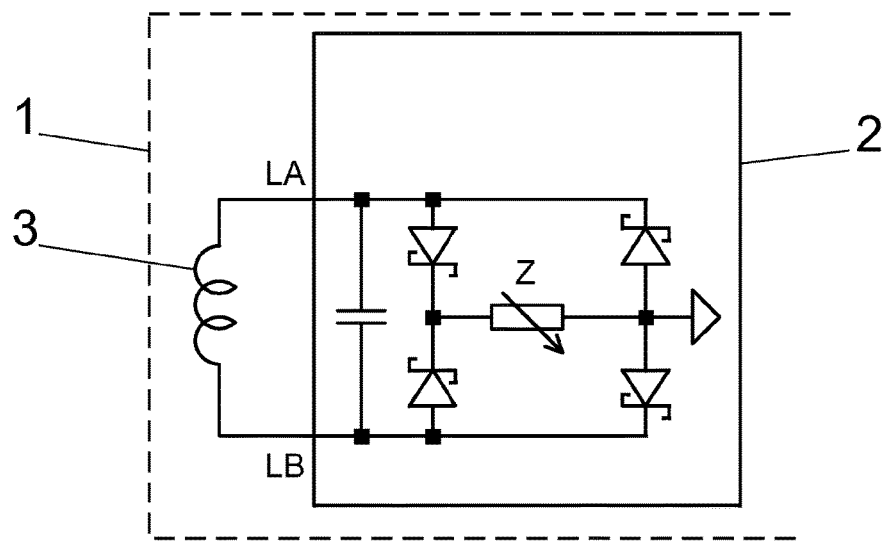
FIG. 1 depicts the connection of the antenna to the analogue NFC driver according to the state of the art.

The original connection according to FIG. 1 has an antenna 3 connected to the LA, LB outputs of the analogue driver 2. The technical task now is to achieve that the signal available on the analogue LA, LB output can be processed by means of the digital direction, whereby—however—the chip of the driver 2 itself lacks the output with the respective digital data of the modulation of the transmitted signal. The need for such procession stems from the low level of the signal on the side of the PCD 4 which is caused by the shielding of the microSD card in the mobile phone. The most direct solution of such defined technical task is the change of the whole design of the contactless interface where the driver 2 is substituted for a new chip with the digital output. From the technological point of view, however, such decision would have led to the far-reaching problems with the compatibility of a new chip and other related electronic circuits would have had to be got from the same producer. This would have meant, among other things, a component dependence on a single supplier and other limitations during the subsequent development of the design of the connection.

For the abovementioned reasons a new connection according to the FIG. 2 is used, where the amplitude demodulator 5 is inserted between the analogue driver 2 and an antenna 3 on the LA, LB outputs. Between the D1 and D2 diodes of the demodulator 5 there is a branch line to which the digitizer 6 is connected; basically, with digitizer 6 the original digital data of the modulation are gathered. The connection of the driver 2 with the demodulator 5 and digitizer 6 now as a whole appear in the same way as if we have driver 2 with the digital output to which the data used during the modulation of the signal on the LA, LB outputs are led. The output of the digitizer 6 can now be used to direct various modifications of the transmitted signal. FIG. 2 does not contain any further circuits included in the dotted line in the denoted element realizing the particular modifications, but it is obvious that after gathering the digital output the respective data can be processed in the components and circuits which are independently known, such as amplifier, modulator, other driver and so on. After the processing, the new signal in this example will be transmitted to the second antenna 32 which affects the signal received on the side of the PCD 4.

The circuit of the demodulator 5 has resistances R2, R3 on the branches stemming from LA, LB; these resistances fine tune the impedance of the connection on the side of the antenna 3, whereby this impedance differs from the original impedance of the original antenna by less than 10%.

During the sending of the signal from the PICC 1 a load change Z in the circuit of the driver 2 changes. This change is followed on the diode demodulator 5 with the diodes D1, D2 behind the LA, LB interface. The demodulated signal from within the diodes D1, D2 is compared in the digitizer and its output are digital data which correspond to the directing data of the modulation used on the side of the driver 2. Between the demodulator 5 and an antenna 3 there is a branch line for the digital phase-locked loop DPLL. Phase-locked loop (PLL) denotes a system which generates the output signal whose phase depends on the phase of the input, reference signal. Usually this concerns the electric circuit involving an oscillator and a phase detector. The circuit compares the phase of the input signal with the phase of the signal produced by the oscillator and the frequency of the oscillator is adjusted in such a way that the phases match.

On FIG. 2 in the lower part there is also depicted a fact that similar connection can be used not only on the removable memory card, but also on SIM card of various formats.

Example 2

Figure 3:
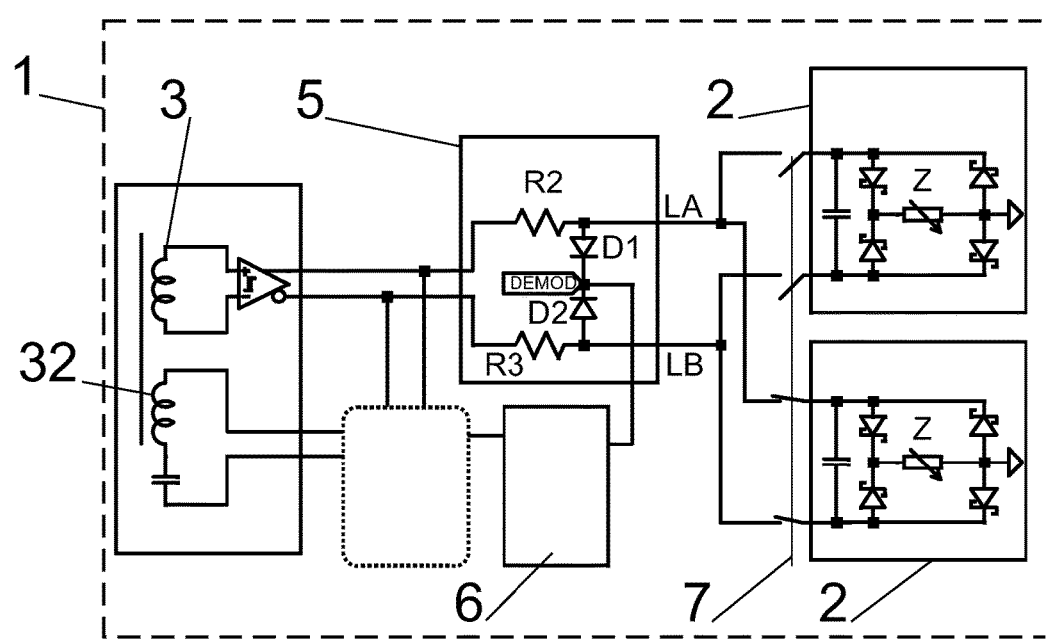
FIG. 3 depicts the system (connection) during the transmission of one of the two switchable drivers which control and serve two independent secure elements on the microSD card.

In this example according to FIG. 3 the invention is used with two drivers 2 with analogue outputs. The existence of two independent contactless interfaces arises from the use of two secure elements which in this example are placed on the microSD card. The switch 7 by which one of the two drivers 2 alternatively connects to the LA, LB connection is used so that the circuit with the demodulator 5 and digitizer 6 does not have to be doubled. The method of processing the signal is then similar as in previous example.

INDUSTRIAL APPLICABILITY

Industrial applicability of the invention is obvious. According to this invention it is possible to process the analogue signal between the driver and the antenna and gather thereof the digital data necessary for the direction of the further modification of the signal. The invention allows for the far-reaching use with the broad scale of the analogue drivers which in practice have higher level of compatibility than chips with digital outputs.

LIST OF RELATED SYMBOLS

1—PICC
2—driver
3—antenna
32—second antenna
4—PCD
5—demodulator
6—digitizer
7—switch
LA, LB—outputs of the driver
R2, R3—resistors
Z—load
D1, D2—diodes of the demodulator
PICC—Proximity Integrated Circuit Card (card communicating at short distance)
PCD—Proximity Coupling Device (reader communicating at short distance)
NFC—Near field communication (protocol of the radio communication communicating at short distance)
DPLL—digital Phase-Locked Loop

The invention claimed is:

1. A system for a processing of a signal transmitted from an analogue near field communication (NFC) driver (2) within a proximity integrated circuit card (PICC) (1) during a contactless transfer of data from the PICC (1) to a proximity coupling device (PCD) (4) with a load modulation, which includes the driver (2) with an analogue output with a modulated signal to which an antenna (3) for a transmission towards the PCD (4) is connected is characterized by the fact, that between the PICC (1) transmitting antenna (3) and the analogue output of the driver (2) of this antenna (3) is within a framework of the PICC a demodulator (5) for a demodulation of the modulated signal transmitted from the driver (2) to the antenna (3) is connected, whereby an output of the demodulator is connected to a digitizer (6); wherein a circuit of the demodulator includes two resistors (R2, R3) on branches connected to outputs (LA, LB) of the driver (2) for fine tuning of an impedance.

2. The system for the processing of the signal transmitted from the analogue NFC driver (2) according to the claim 1 is characterized by the fact, that a second driver is connected to the digitizer (6), whereby the second driver is designed to change an amplitude of the signal detected on a side of the PCD (4); preferably it changes the amplitude by means of a phase change.

3. The system for the processing of the signal transmitted from the analogue NFC driver (2) according to claim 1 is characterized by the fact, that a PICC (1) antenna set includes a second antenna (32) wound on a common core together with a winding of the antenna (3).

4. The system for the processing of the signal transmitted from the analogue NFC driver (2) according to the claim 3 is characterized by the fact, that, a winding of the second antenna (32) is connected to an output of the signal which is modified on a basis of data from the demodulator (5) and/or the digitizer (6).

5. A system for a processing of a signal transmitted from an analogue near field communication (NFC) driver (2) within a proximity integrated circuit card (PICC) (1) during a contactless transfer of data from the PICC (1) to a proximity coupling device (PCD) (4) with a load modulation, which includes the driver (2) with an analogue output with a modulated signal to which an antenna (3) for a transmission towards the PCD (4) is connected is characterized by the fact, that between the PICC (1) transmitting antenna (3) and the analogue output of the driver (2) of this antenna (3) is within a framework of the PICC a demodulator (5) for a demodulation of the modulated signal transmitted from the driver (2) to the antenna (3) is connected, whereby an output of the demodulator is connected to a digitizer (6); wherein between the demodulator (5) and the antenna (3) there is a branch line for a phase-locked loop, wherein the phase-locked loop is connected to wiring which connects the antenna (3) with the demodulator (5).

6. A system for a processing of a signal transmitted from an analogue near field communication (NFC) driver (2) within a proximity integrated circuit card (PICC) (1) during a contactless transfer of data from the PICC (1) to a proximity coupling device (PCD) (4) with a load modulation, which includes the driver (2) with an analogue output with a modulated signal to which an antenna (3) for a transmission towards the PCD (4) is connected is characterized by the fact, that between the PICC (1) transmitting antenna (3) and the analogue output of the driver (2) of this antenna (3) is within a framework of the PICC a demodulator (5) for a demodulation of the modulated signal transmitted from the driver (2) to the antenna (3) is connected, whereby an output of the demodulator is connected to a digitizer (6); wherein the system further includes a switch (7) by means of which the circuit of the demodulator (5) is connected to one of multiple drivers (2); wherein each driver is assignable to an independent secure element placed within the PICC (1).

7. The system for the processing of the signal transmitted from the analogue NFC driver (2) according to the claim 6 is characterized by the fact, that the switch (7) is analogue.

8. A signal processing method, comprising:
transmitting a signal from an analogue near field communication (NFC) driver (2) during a contactless transfer of data from a proximity integrated circuit card (PICC) (1) to a proximity coupling device (PCD) (4), wherein the NFC driver generates a modulated analogue signal encoding data;
inputting the modulated analogue signal to a demodulator (5) and thereby demodulating the modulated analogue signal;
inputting the demodulated signal to a first antenna (3);
generating digital data from the demodulated signal input to the first antenna;
using the digital data for amplification and/or attenuation of a signal received by the PCD, wherein the signal is amplified and/or attenuated only during a required time period within a single transmission event; and
using the digital data for modulation of a signal transmitted to a second antenna (32), wherein the first and second antennae are wound on a common core such that they are electromagnetically coupled.

9. The signal processing method of claim 8, wherein the signal received by the PCD is amplified after completion of a mutual initial setting of a level of the PICC and PCD signals within the single transmission event.

10. The signal processing method of claim 8, wherein the PICC includes a second active driver directed by means of the digital data from the demodulated signal.

11. A a proximity integrated circuit card (PICC), comprising:
an analogue near field communication (NFC) driver (2) configured to generate a modulated analogue signal encoding data;
a demodulator (5) coupled to the NFC driver and configured to demodulate the modulated analogue signal;
a first antenna (3) coupled to the demodulator such that the demodulated signal input to the first antenna; and
a second antenna (32), wherein the first and second antennae are wound on a common core such that they are electromagnetically coupled.

12. The PICC of claim 11, further comprising:
means for generating digital data from the demodulated signal input to the first antenna;
means for using the digital data for amplification and/or attenuation of a signal received by a proximity coupling device (PCD) (4) configured to be electromagnetically coupled to the first and second antennae; and
means for using the digital data for modulation of a signal transmitted to the second antenna.

13. The PICC of claim 11, further comprising a second active driver.

* * * * *